(12) United States Patent
Wang

(10) Patent No.: US 8,990,176 B2
(45) Date of Patent: Mar. 24, 2015

(54) MANAGING A SEARCH INDEX

(75) Inventor: Øivind Wang, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 13/607,832

(22) Filed: Sep. 10, 2012

(65) Prior Publication Data
US 2014/0074810 A1    Mar. 13, 2014

(51) Int. Cl.
*G06F 17/30* (2006.01)
(52) U.S. Cl.
CPC .... *G06F 17/30946* (2013.01); *G06F 17/30864* (2013.01)
USPC .......................................................... 707/696
(58) Field of Classification Search
None
See application file for complete search history.

(56) References Cited

U.S. PATENT DOCUMENTS

| | | | |
|---|---|---|---|
| 8,028,019 B2 | 9/2011 | Thompson | |
| 2002/0078174 A1 | 6/2002 | Sim et al. | |
| 2003/0078987 A1* | 4/2003 | Serebrennikov | 709/217 |
| 2007/0094275 A1* | 4/2007 | Fanning et al. | 707/10 |
| 2007/0156855 A1 | 7/2007 | Johnson | |
| 2007/0168336 A1* | 7/2007 | Ransil et al. | 707/3 |
| 2008/0010372 A1 | 1/2008 | Khedouri et al. | |
| 2008/0021902 A1* | 1/2008 | Dawkins et al. | 707/10 |
| 2008/0033910 A1 | 2/2008 | Richards et al. | |
| 2008/0140853 A1 | 6/2008 | Harrison | |

OTHER PUBLICATIONS

Ports, Dan R. K., "Arpeggio: Metadata Indexing in a Structured Peer-to-Peer Network", Retrieved at <<http://drkp.net/drkp/papers/arpeggio-meng.pdf>>, Master Thesis, Massachusetts Institute of Technology, Feb. 2, 2007, pp. 1-58.
Stribling, et al., "OverCite: A Distributed, Cooperative CiteSeer", Retrieved at <<http://static.usenix.org/event/nsdi06/tech/full_papers/stribling/stribling.pdf>>, Proceedings of 3rd Symposium on Networked Systems Design & Implementation, May 9, 2006, pp. 143-153.

* cited by examiner

*Primary Examiner* — Bai D. Vu
(74) *Attorney, Agent, or Firm* — Tom Wong; Jim Ross; Micky Minhas

(57) ABSTRACT

Concepts and technologies are described herein for managing a search index. In accordance with the concepts and technologies disclosed herein, a search index can be hosted by a number of search nodes. The search engine can be configured to determine if a search node is unavailable, and if so, if data stored at the unavailable search node is to be replaced. If data stored at the unavailable search node is to be replaced, the search engine can identify sources for data to be used to replace the data at the unavailable search node. The search engine can issue instructions to the sources and/or the unavailable search node to copy the data from the sources to the unavailable node and/or to replace the data at the unavailable node with the data from the sources. Portions of the data can be copied from each of the sources to the unavailable node.

20 Claims, 5 Drawing Sheets

MANAGING A SEARCH INDEX

BACKGROUND

With increased numbers of data sources on the Internet, networks, Web sites, and/or other resources, search engines and other functionality for searching resources have become an important tool for locating information. Searchers may submit queries to a search engine to identify documents that match particular search strings. To respond to these queries, search engines or other search applications often maintain search indexes against which queries can be run.

Because the search indexes may correspond to extensive numbers of documents associated with the resources, the search index files can consume a large amount of data. In the case of a Web search engine, for example, a search index file may consume hundreds of Gigabytes or even terabytes of data. On top of the large size of the search index files, search engines also may be configured to maintain multiple copies of the search index files. For example, multiple copies of the search index may be maintained to accommodate simultaneous queries, to provide redundancy of the search index, to distribute copies of the search index geographically, and/or for other purposes.

Because the search index files can be large, maintaining multiple copies of the search index can be expensive in terms of time, computing, and/or network resources. In particular, if a copy of the search index is corrupted or lost, restoring that copy can require transfer of the search index file between multiple devices to replace the corrupted or lost file. This can impact performance of the search engine by inhibiting access to the search index files and consuming computing and network resources among the devices hosting the search index.

It is with respect to these and other considerations that the disclosure made herein is presented.

SUMMARY

Concepts and technologies are described herein for managing a search index. In accordance with the concepts and technologies disclosed herein, a search index can be hosted by a number of search nodes. The search nodes can include one or more data storage devices and/or computing devices hosting nodes and/or replicated nodes. The nodes can host one or more portions of the search index ("index portions"), and the replicate nodes can host copies of the index portions ("replicate index portions"). Multiple replicate index portions can be maintained for any particular index portion.

In some embodiments, the search engine can be configured to periodically poll or ping the various search nodes to determine if a search node is unavailable. In some other embodiments, the search engine can determine, based upon successful or unsuccessful requests, that a particular search node is or is not unavailable. Thus, the search engine can be configured to determine that a search node is unavailable passively and/or actively.

If the search engine determines that a search node is unavailable, the search engine can determine an amount of time for which the search node is or has been unavailable, a number of operations executed during a time in which the search node is or has been unavailable, or the like. Based upon these and/or other considerations, the search engine can determine if the data stored by the unavailable search node is to be replaced. In some embodiments, the search engine can be configured to make this determination based, at least partially, upon the determined time and/or number of operations, which may be compared to established thresholds for these and/or other information. Alternatively, the search engine can determine that the data stored at the unavailable search node is to be updated and not replaced.

According to one aspect, if the search engine determines that data stored at the unavailable search node is to be replaced, the search engine can identify a source for data to be used to replace the data at the unavailable search node. If the unavailable search node corresponds to a replicate node hosting a replicate index portion, for example, the search engine can identify a node hosting an index portion (of which the replicate index portion is a copy) as the source. Additionally, or alternatively, one or more of the sources can be aware that other nodes such as replicate nodes or the like are offline and can determine that an update or replace process is to be completed.

The search engine or one or more of the sources can be configured to issue instructions to copy the data from the source to the one or more unavailable nodes and to replace the data at the unavailable nodes with the data from the source. If multiple sources are identified by the search engine, portions of the data can be copied from each of the multiple sources to one or more of the unavailable nodes. Furthermore, as previously unavailable nodes become available, these previously unavailable nodes can become new sources for the data to other unavailable nodes. Thus, the sources for the data can change as the unavailable nodes are restored. As such, multiple sources of the data can be used to reduce one or more costs of replacing or updating data at one or more unavailable search nodes such as, for example, time, network bandwidth, energy, CPU usage, or the like. Additionally, the concepts and technologies disclosed herein can be used to address changes in query load at one or more nodes. Thus, for example, when queries are determined to have increased, a new or additional replicate node can be designated to handle some of the query load.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
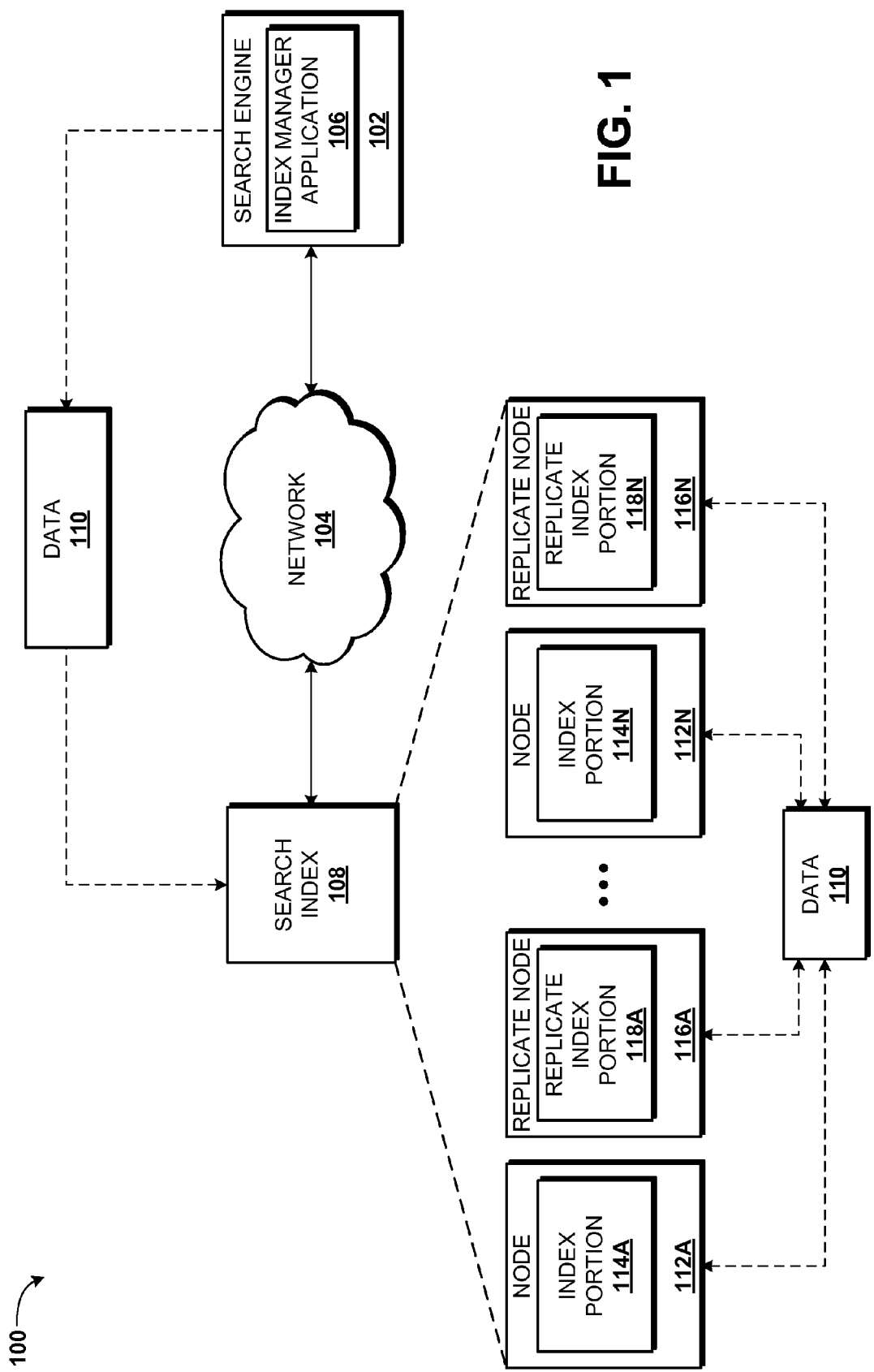
FIG. 1 is a system diagram illustrating an illustrative operating environment for the various embodiments disclosed herein.

The following detailed description is directed to concepts and technologies for managing a search index. According to the concepts and technologies described herein, a search index can be hosted by a number of search nodes. The search nodes can include one or more nodes and/or replicated nodes. The nodes can host one or more portions of the search index ("index portions") and the replicate nodes can host copies of the index portions ("replicate index portions"). Multiple replicate index portions can be maintained for any particular index portion. The search engine can be configured to determine if a search node is or has been unavailable. In some embodiments, the search engine can determine if data stored at the unavailable search node is to be replaced.

If the search engine determines that data stored at the unavailable search node is not to be replaced, the data at the unavailable search node can be updated. If the search engine determines that the data stored at the unavailable search node is to be replaced, the search engine can identify a source for data to be used to replace the data at the unavailable search node. The search engine can issue instructions to the source and/or the unavailable search node to copy the data from the source to the unavailable node and/or to replace the data at the unavailable node with the data from the source. If multiple sources are identified by the search engine, portions of the data can be copied from each of the sources to the unavailable node. As unavailable nodes are restored, these previously unavailable nodes can become sources for other unavailable nodes. As such, the sources for the data can change during various restore operations.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for managing a search index will be presented.

Referring now to FIG. 1, aspects of one operating environment 100 for the various embodiments presented herein will be described. The operating environment 100 shown in FIG. 1 includes a search engine 102 operating as a part of or in communication with a communications network ("network") 104. As generally is understood, the functionality of the search engine 102 can be provided by one or more server computers configured to execute various applications. For example, the search engine 102 can be configured to execute an operating system (not illustrated) and one or more application programs such as, for example, a search application (not illustrated), an index manager application 106, and/or other application programs. Because functionality associated with search applications is generally understood, the search application is not further described herein.

The operating system is a computer program for controlling the operation of the search engine 102. The index manager application 106 is an executable program configured to execute on top of the operating system and/or the search application to provide the functionality described herein for controlling and/or managing a search index. In particular, as will be explained in more detail below, the search engine 102 can be configured to create, update, and/or manage a search index 108 or other files. According to various embodiments, the search index 108 can be hosted at and/or stored by one or more data storage devices such as, for example, mass storage devices, memory devices, server computers, desktop computers, laptop computers, other computing systems, or the like. Because other real or virtual devices can be configured to store the search index 108, it should be understood that this embodiment is illustrative, and should not be construed as being limiting in any way.

According to various embodiments, the search index 108 is created and/or managed by the search engine 102 via one or more instances of data 110. The data 110 can include, for example, requests for storing data corresponding to the search index 108, queries of the search index 108, data replication commands or requests relating to the search index 108, and/or other communications. According to some implementations of the concepts and technologies disclosed herein, the index manager application 106 can be configured to manage the distribution, updating, and/or recovery of the search index 108 by generating commands and/or requests such as, for example, the data 110.

In some embodiments, the search engine 102 is configured, via execution of the index manager application 106, to create the search index 108 as a number of search nodes distributed among a number of data storage and/or computing devices. In the illustrated embodiment, the search index 108 is illustrated as including and/or residing at multiple nodes 112A-N (hereinafter collectively and/or generically referred to as "nodes 112"). The nodes 112 can be maintained by the index manager application 106 and/or other programs executed by the search engine 102 for purposes of creating, distributing, replicating, managing, updating, and/or replacing the search index 108 and/or for other purposes.

According to some implementations, the node 112 can host or store respective portions of the search index 114A-N (hereinafter collectively and/or generically referred to as "index portions 114"). Thus, the nodes 112 can host respective index portions 114 to provide, collectively, the search index 108. Because the search engine 102 can manage the distribution of the search index 108 among the nodes 112, the search engine 102 and/or the index manager application 106 executed thereby can be aware of the respective portions of the search index 108 that are stored or hosted by the respective nodes 112. It should be understood that any number of nodes 112 and/or index portions 114 can be used to provide the search index 108. In some embodiments, thousands of nodes 112 may be used to store data associated with a particular search index 108. As such, the illustrated embodiment should be understood as being illustrative and should not be construed as being limiting in any way.

In some embodiments of the concepts and technologies disclosed herein, the search engine 102 can be configured to create and/or manage multiple redundant and/or replicate version of the search index 108. As shown in the illustrated embodiment, the search engine 102 can replicate the search index 108 by way of storing data at one or more replicate nodes 116A-N (hereinafter collectively and/or generically referred to as "replicate nodes 116"). The replicate nodes 116 can be stored and/or hosted at any type of devices including, but not limited to, the devices discussed above with respect to the search index 108 and/or the nodes 112.

According to various implementations, the search engine 102 can create replicate index portions 118A-N (hereinafter collectively and/or generically referred to as "replicate index portions 118") that can correspond, respectively, to the index portions 114. As such, the replicate node 116A can store a replicate index portion 118A that can be an exact copy or replicate of the index portion 114A stored at the node 112A. Thus, it should be understood that updates to the index portions 114 and/or the replicate index portions 118 can be reflected to one another to keep the index portions 114 and the replicate index portions 118 synchronized. Thus, the nodes 112 and the replicate nodes 116 can share data 110 with each other to maintain redundant copies of the various index portions 112.

While the nodes 112 and the replicate nodes 116 are illustrated as being proximate to one another, it should be understood that the nodes 112 and/or the replicate nodes 116 may be distributed across geographic locations, networks, and/or computing resources. As such, the replication of the nodes 112 at the replicate nodes 116 may fail at various times and/or for various reasons. For example, a network connection between a node 112 and a replicate node 116 may be lost, thereby preventing updating of the replicate node 116. Similarly, a disk failure or other catastrophic event may result in a loss of data at one or more of the nodes 112 and/or the replicate nodes 116. Because the index manager application 108 can be aware of the locations of the various index portions 114 and/or replicate index portions 118 at the various nodes 112 and/or replicate nodes 116, the search engine 102 can take steps to update or replace the data distributed among the nodes 112 and/or the replicate nodes 116 when the failure is remedied.

In some embodiments, as will be described in more detail below particularly with respect to FIGS. 2A-3, the index manger application 106 can determine that one or more of the nodes 112 and/or replicate nodes 116 are unavailable. For example, the index manager application 106 can determine that one or more nodes 112 and/or replicate nodes 116 have gone offline, experienced a disk failure, lost network connectivity, stopped responding, or experienced another type of failure. Because the nodes 112 and/or the replicate nodes 116 can be unavailable for various reasons, it should be understood that these embodiments are illustrative, and should not be construed as being limiting in any way.

Furthermore, it should be understood that the operations disclosed herein for updating or replacing data at a single unavailable node 112 or a single replicate node 116 can be performed after the failure has been remedied and/or with respect to multiple unavailable nodes 112 and/or multiple replicate nodes 116. As such, it should be understood that identifying one or more unavailable resources can include determining that the failure(s) that caused the unavailability of the one or more resources has since been remedied. It should be understood that this embodiment is illustrative, and should not be construed as being limiting in any way.

In response to determining that one or more of the nodes 112 and/or replicate nodes 116 is unavailable, the index manger application 106 can determine whether or not to replace the index portion 114 or replicate index portion 118 stored at the one or more unavailable nodes 112 and/or replicate nodes 116. Thus, the index manager application 106 can determine if one or more respective index portions 114 and/or replicate index portions 118 is or are to be replaced or updated, among other actions. For example, if a particular node 112 or replicate node 116 has been unavailable for a period of time that exceeds a determined threshold such as five minutes, ten minutes, thirty minutes, one hour, or the like, the index manager application 106 can determine that the index portion 114 or the replicate index portion 118 stored at the node 112 and/or replicate node 116 is to be replaced. Because the threshold can be any period of time, a number of operations, or other defined measurements, it should be understood that these embodiments are illustrative, and should not be construed as being limiting in any way. If one or more of the nodes 112 and/or replicate nodes 116 has been unavailable for a period of time that does not meet or exceed the determined threshold of time, the index manager application 106 can determine that the respective index portion 114 and/or the replicate index portion 118 is to be updated.

According to various embodiments, the index manager application 106 can determine that the index portion 114 or the replicate index portion 118 is to be completely replaced due to determining that a time threshold or period of time has been met. Meeting such a threshold can be understood by the index manager application 106 as corresponding to a passage of time that suggests that it would be more efficient to replace the index portion 114 or the replicate index portion 118 than to attempt to update the index portion 114 or the replicate index portion 118. Various contemplated time periods and/or time thresholds are described above and are not repeated here. It should be understood that these and other time periods and/or time thresholds can be used based upon settings, configurations, or other considerations. In response to determining that the index portion 114 or the replicate index portion 118 is to be replaced, the index manager application 106 can identify one or more sources for the data to be used to replace the index portion 114 or the replicate index portion 118. Thus, for example, the index manager application 106 can be configured to identify one or more devices that have replicate copies of the index portion 114 or the replicate index portion 118 that can be used to replace the index portion 114 and/or the replicate index portion 118 at one or more unavailable nodes 112 and/or replicate nodes 116.

The index manager application 106 also can be configured to determine one or more portions of the index portion 114 or the replicate index portion 118 stored at the one or more sources to be copied to one or more failed or unavailable nodes 112 or replicate nodes 116. Thus, it should be understood that in various embodiments of the concepts and technologies disclosed herein, the data corresponding to the index portion 114 or the replicate index portion 118 can be copied from a number of sources simultaneously. Furthermore, it should be understood that after a node 112 or replicate node 116 is at least partially restored, the previously unavailable node 112 or previously unavailable replicate node 116 can itself become a source of data for other unavailable nodes 112. As such, it should be understood that nodes 112 and/or replicate nodes 116 can act as a source for data stored by those nodes 112 and/or replicate nodes 116 even as those nodes 112 or replicate nodes 116 are still restoring data.

As such, embodiments of the concepts and technologies disclosed herein can be used to reduce the time, computing power, network resources, and/or other costs of replacing the index portion 114 or the replicate index portion 118 at the previously unavailable node 112 or replicate node 116, as well as improve the performance and/or reliability of the search index 108 by allowing errors to be quickly detected and remedied. By dynamically controlling the sources of the data used to restore nodes 112 and/or replicate nodes 116, the concepts and technologies disclosed herein can drastically reduce time required to restore multiple unavailable nodes 112. In addition to these nodes 112 accessing different data from different sources, these nodes 112 also can act as sources to one another for the data accessed by these nodes 112.

In some embodiments, though not shown in FIG. 1, the search engine 102 and/or the index manager application 106 can maintain a master search index from which data can be copied to the nodes 112 and/or replicate nodes 116 in the event of a failure. In other embodiments, the data can be copied from nodes 112 and/or replicate nodes 116 to one another. While the embodiments of copying data from nodes 112 and/or replicate nodes 116 to one another are illustrated and described herein, it should be understood that this embodiment is illustrative, and should not be construed as being limiting in any way. Additionally, the index manager application 106 can be configured to manage the search index 108 and/or the distribution and/or copying of data among the nodes 112 and/or replicate nodes 116 via commands formatted in the BITTORRENT protocol. Because other protocols can be used, it should be understood that this embodiment is illustrative, and should not be construed as being limiting in any way.

FIG. 1 illustrates one search engine 102, one network 104, one search index 108, two nodes 112, and two replicate nodes 116. It should be understood, however, that some implementations of the operating environment 100 include multiple search engines 102, multiple networks 104, multiple search indexes 108, one or more nodes 112, and one or more replicate nodes 116. Thus, the illustrated embodiments should be understood as being illustrative, and should not be construed as being limiting in any way.

Figure 2A:
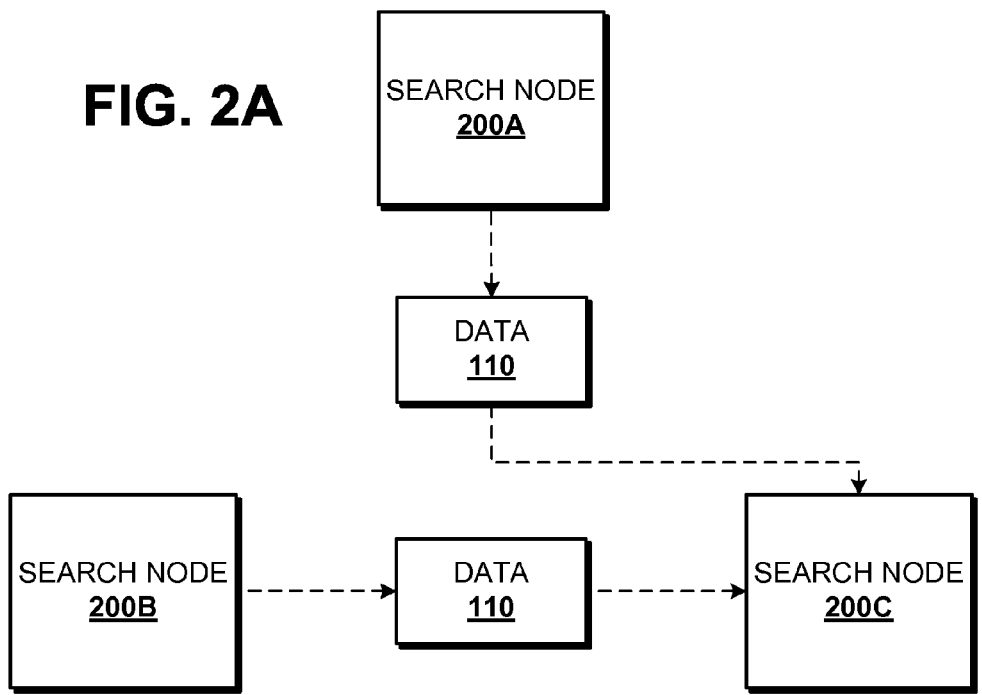
FIGS. 2A-2B are line drawings schematically illustrating aspects of managing a search index, according to various embodiments.
Figure 2B:
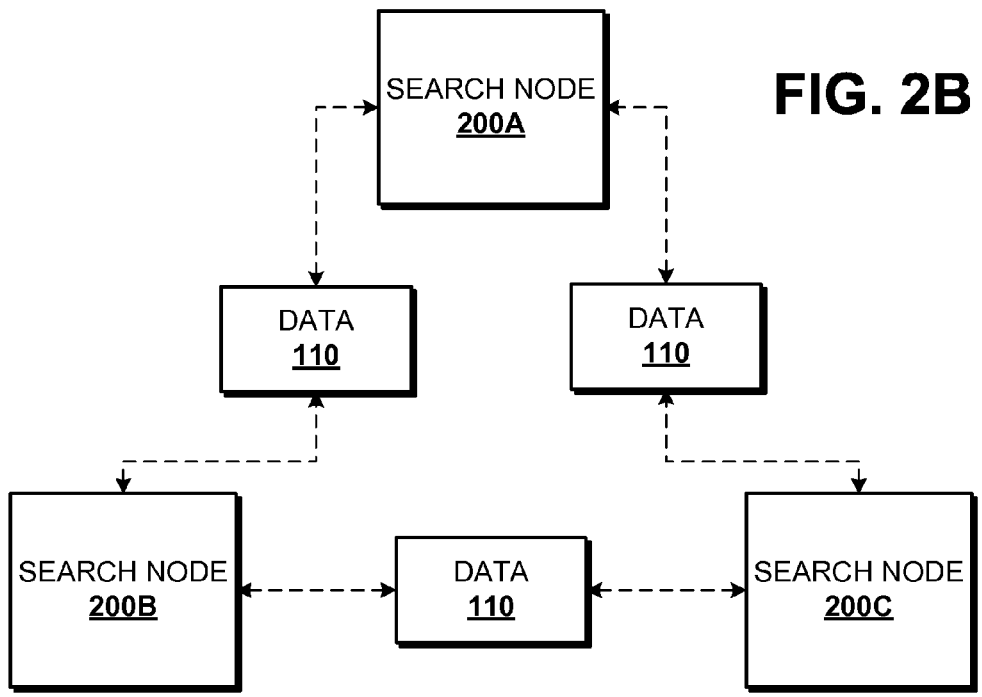

Referring now to FIGS. 2A-2B, additional aspects of the concepts and technologies disclosed herein for updating a search index 108 will be described in detail. As shown in FIG. 2A, the search engine 102 can maintain a search index 108 across multiple search nodes 200A-C (hereinafter collectively and/or generically referred to as "search nodes 200"). It should be understood from the description of FIG. 1 that the term "search node" as used herein can be used to refer to a node 112 or a replicate node 116. Additionally, it should be understood that while three search nodes 200 are shown in FIGS. 2A-2B, the search index 108 can be stored at a single search node 200 and/or across any number of search nodes 200. As such, it should be understood that the illustrated embodiments are illustrative, and should not be construed as being limiting in any way.

As shown in FIG. 2A, the index management application 106 can determine that one or more of the search nodes 200 is or has been unavailable. As explained above, the index management application 106 can determine if the data stored at the search node 200 is to be updated or replaced, and can issue commands or requests for updating or replacing the data at the search node 200. Additionally, or alternatively, the search nodes 200 themselves can be configured to provide the functionality described herein with respect to the index management application 106 to issue requests for updating and/or replacing data at the search nodes 200. In the illustrated embodiment, the search node 200C is illustrated as having been unavailable for some duration of time or a number of data write or read operations. When the failure is resolved, the index management application 106 and/or the search nodes 200 can perform operations to repopulate, update, or replace the data stored at the search node 200C.

According to various embodiments, the index management application 106 can be configured to determine if one or more search nodes 200 are to operate as a source for the data 110. In the illustrated embodiment, the index management application 106 is configured to determine that the search nodes 200A, 200B are to operate as sources of the data 110, and that the data 110 is to be used to update the search node 200C. Thus, as shown in FIG. 2A, the search node 200C can be configured to obtain the data 110 and/or portions thereof from any number of sources such as the search nodes 200A, 200B. Thus, for example, if the data at the search node 200C is to be replaced entirely, the search node 200C can obtain the data 110 from two sources instead of a single source. As such, some embodiments of the concepts and technologies disclosed herein can be used to decrease an amount of time over which the restore, replace, and/or other update operations are executed; to balance network and/or computing power resources across multiple search nodes 200 during recovery operations; and/or to otherwise reduce load on particular search nodes 200 while maintaining and/or restoring multiple copies of the search index 108. Because any number of sources for the data 110 can be used to update the data at the search node 200C, it should be understood that the illustrated embodiment is illustrative, and should not be construed as being limiting in any way.

FIG. 2B illustrates additional aspects of the concepts and technologies disclosed herein for updating a search index 108. In particular, FIG. 2B shows how each of the search nodes 200 can be configured to share the data 110 and/or portions thereof with one another to maintain multiple redundant copies of the data stored by each of the search nodes 200. As explained above with reference to FIG. 1, the data stored by the search nodes 200 can include, but is not limited to, the index portions 114 and/or the replicate index portions 118. Additionally, or alternatively, the data stored by the search nodes 200 can include the entire search index 108 and/or replicate copies thereof. As such, it can be appreciated that each search node 200 used to host the search index 108 and/or portions thereof can share data 110 with other search nodes 200, thereby allowing recovery of failed search nodes 200 from multiple sources instead of relying upon a point-to-point restore of search nodes 200.

FIG. 2B also illustrates how the search nodes 200 can be configured to provide the data 110 to each other during an update, restore, or replace process as described herein. In particular, the search nodes 200 can act as sources to one another while the various search nodes 200 are in the process of being restored. More particularly, if the search nodes 200B and 200C both were unavailable, the search nodes 200B-C can each be configured to access the data 110 from the search node 200A or other search nodes (not visible in FIG. 2B). The search nodes 200B-C then can also act as a source for the data 110 for each other, thereby drastically reducing the load on the search node 200A and the time required to restore both search nodes 200B-C. As such, it should be understood that that embodiments of the concepts and technologies disclosed herein can be used to improve restore time of search nodes 200 and/or the costs of restoring these search nodes 200. It should be understood that this embodiment is illustrative, and should not be construed as being limiting in any way.

Figure 3:
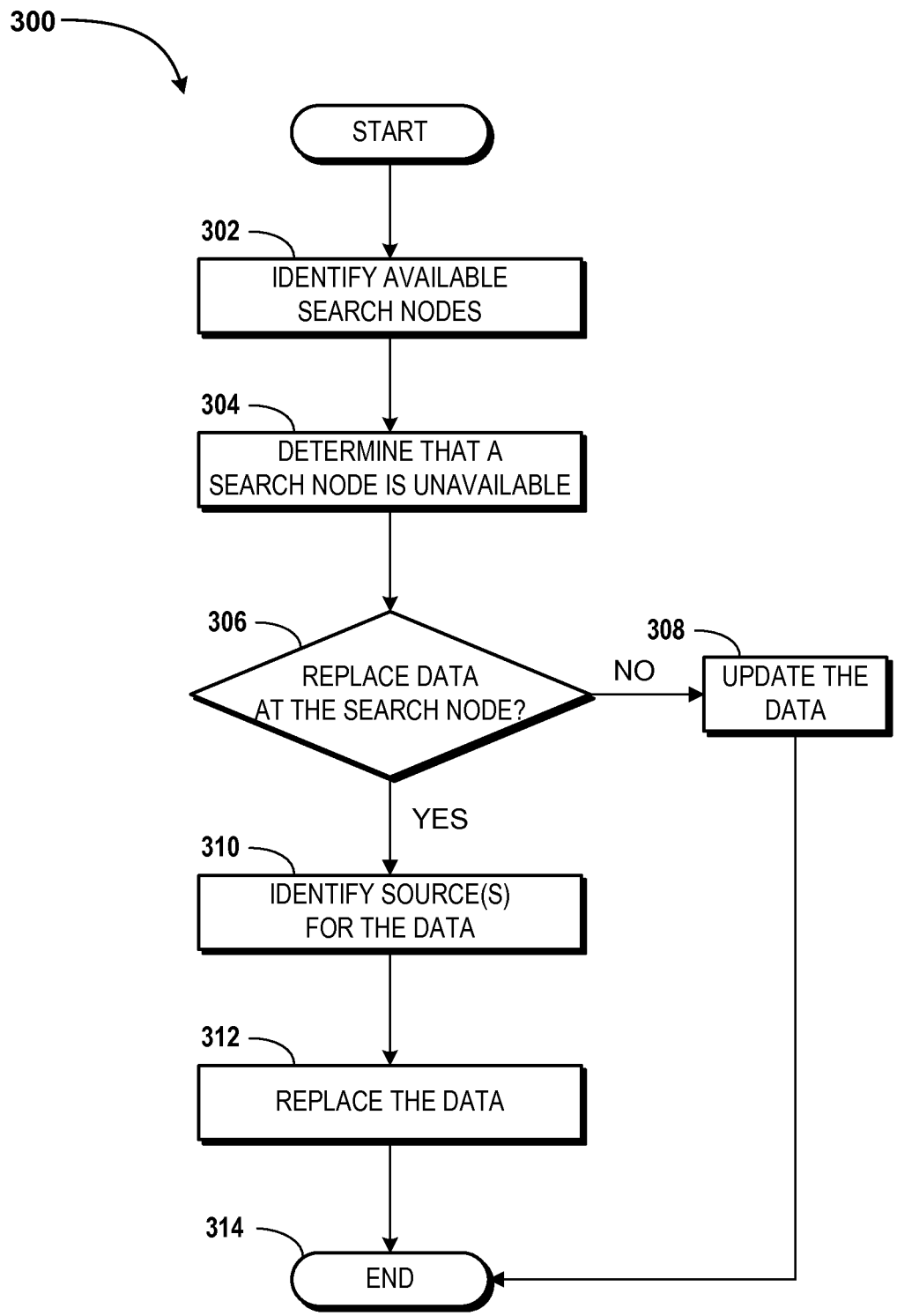
FIG. 3 is a flow diagram showing aspects of a method for managing a search index, according to an illustrative embodiment.

Turning now to FIG. 3, aspects of a method 300 for managing a search index will be described in detail. It should be understood that the operations of the method 300 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 300 can be ended at any time and need not be performed in its entirety. Some or all operations of the method 300, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 300 disclosed herein is described as being performed by the search engine 102 via execution of computer executable instructions such as, for example, the index manager application 106. It should be understood that these embodiments are illustrative, and should not be viewed as being limiting in any way. In particular, devices other than and/or in addition to the search engine 102 can provide the functionality described herein via execution of computer executable instructions other than and/or in addition to the index manager application 106.

The method 300 begins at operation 302, wherein the search engine 102 identifies available search nodes 200. According to various embodiments, the search engine 102 can periodically poll, ping, or otherwise communicate with the search nodes 200 to determine if one or more of the search nodes 200 is or are available. According to some other embodiments, the search engine 102 may not perform particular functions to determine if the search nodes 200 are available and instead can determine based upon successful or unsuccessful operation execution that the search nodes 200 are or are not available.

For example, the search engine 102 can determine, based upon a failed query of a search node 200, that the search node 200 is unavailable. Similarly, the search engine 102 can determine, based upon a successful query of a search node 200, that the search node 200 is available. Other operations that can indicate that a search node 200 is available or unavailable include, but are not limited to, failed or successful write operations; failed or successful update operations; failed or successful document indexing operations; failed or successful pinging or polling operations; failed or successful administrative configuration operations; and/or other operations. Because various operations and/or monitoring functions can be executed by the search engine 102, it should be understood that these embodiments are illustrative, and should not be construed as being limiting in any way.

From operation 302, the method 300 proceeds to operation 304, wherein the search engine 102 can determine that a search node 200 is unavailable. As mentioned above, a search node 200 can be unavailable due to network connectivity failures or other problems, hardware malfunctions or failures, software malfunctions or errors, and/or other reasons. Thus, the search engine 102 may determine, in operation 304, that a query of the search index 108 has failed, that read, write, or modify operations have failed, that document indexing operations have failed, or the like. Similarly, the search engine 102 can determine via a periodic polling or pinging of the search index 108 and/or the search nodes 200 hosting the search index 108 that one or more of the search nodes 200 is offline. In light of the above description of the various ways in which the search engine 102 can detect unavailability of a search node 200, it should be understood that these embodiments are illustrative, and should not be construed as being limiting in any way.

Additionally, in operation 304, the search engine 102 can identify a particular search node 200 that is unavailable. In particular, if the search index 108 is distributed among multiple search nodes 200, the search engine 102 can determine what search node 200 is unavailable by determining what portion of the search index 108 is involved in a failed operation and correlating that information with information indicating what search node 200 hosts that particular portion of the search index 108. Because other operations for identifying an unavailable search node 200 are possible and are contemplated, it should be understood that this embodiment is illustrative, and should not be construed as being limiting in any way.

From operation 304, the method 300 proceeds to operation 306, wherein the search engine 102 can determine if the data associated with the search node 200 determined to be unavailable in operation 304 is to be replaced. As explained above, the data stored at a search node 200 can correspond to the search index 108, a replicate copy of the search index 108, an index portion 114, and/or a replicate index portion 118. In operation 306, the search engine 102 can determine if the data stored at the search node 200 determined to be unavailable in operation 304 is to be replaced, updated, or otherwise modified. In some embodiments, for example, the search engine 102 can apply a threshold time period, a threshold number of operations, and/or other threshold values to determine if the data stored at the search node 200 is to be replaced or updated. The definition of the threshold can be set by a user or other entity and/or can be determined by the search engine 102 on a case-by-case basis by determining if updating the data at the search node 200 is more or less efficient than replacing the data at the search node 200. Various contemplated time periods and/or other thresholds have been explained above and are not restated here for the sake of brevity. Briefly, however, the search engine 102 can determine if a threshold is met and/or if replacement would be more efficient than updating the data stored at the search node 200.

If the search engine 102 determines, in operation 306, that the data stored by the search node 200 is to be updated (and not replaced entirely), the method 300 can proceed to operation 308. At operation 308, the search engine 102 can issue commands and/or requests for updating the data stored at the search node 200. As mentioned above, the various search nodes 200 can be configured, in some embodiments, to issue the commands and/or requests instead of, or in addition to, the search engine 102. As such, it should be understood that the search nodes 200 can be configured to provide the functionality described herein with respect to operation 306, in some embodiments. Additionally, it should be understood that the commands and/or requests can be issued in several ways. For example, a difference disk or other entity embodying differences between a time the search node 200 became unavailable and the current time can be calculated and transmitted to the search node 200 as the data 110 illustrated in FIG. 1. The search node 200 can be configured to pull or otherwise receive this data 110 from one or more of the other search nodes 200 used to provide the search index 108.

If the search engine 102 determines, in operation 306, that the data stored by the search node 200 is to be replaced, the method 300 can proceed to operation 310. At operation 310, the search engine 102 and/or the search nodes 200 can identify one or more sources for the data to be used to replace the data stored at the previously unavailable search node 200. The search engine 102 and/or search nodes 200 can be configured to identify the sources based upon geographic locations of the search nodes 200 with respect to one another; network availability, latency, and/or bandwidth between the search nodes 200; CPU utilization associated with one or more devices used to host the search nodes 200; and/or other considerations. According to some embodiments, the search engine 102 and/or the search nodes 200 can be configured to issue commands using the BITTORRENT protocol, and therefore can be configured to determine the sources using the BITTORRENT protocol as well. Because other considerations can be used to determine the sources, it should be understood that these embodiments are illustrative, and should not be construed as being limiting in any way.

From operation 310, the method 300 proceeds to operation 312, wherein the search engine 102 and/or the search nodes 200 can issue commands or requests for replacing the data at the search node 200. According to various embodiments, the search engine 102 and/or the search nodes 200 can issue one or more commands, instructions, requests, or the like for directing the search node 200 determined to be unavailable in operation 304 to obtain the data 110 from one or more other search nodes 200 and/or for instructing one or more search nodes 200 to transmit the data 110 to the previously unavailable search node(s) 200.

As explained above, the search engine 102 and/or the search nodes 200 can be configured to command the previously unavailable search node 200 to obtain portions of the data 110 from multiple sources as identified in operation 310. Additionally, as explained above, the sources of identified in operation 310 can change while one or more unavailable nodes 112 are restored. In particular, as some nodes 112 are restored, these nodes 112 can themselves become sources for other unavailable nodes 112. As such, embodiments of the concepts and technologies disclosed herein can be used to reduce an amount of time needed to replace the data at the search nodes 200 relative to a point-to-point restore of the search node 200, though this is not necessarily the case. Additionally, or alternatively, embodiments of the concepts and technologies disclosed herein can be used to reduce usage of network resources between particular search nodes 200 by distributing read and copy operations across multiple search nodes 200; reduce processor usage of particular search nodes 200 by distributing these operations across multiple search nodes 200; and/or otherwise reduce usage of particular search nodes 200 during recovery operations by distributing operations across multiple search nodes 200. Thus, it can be appreciated that multiple search nodes 200 can be used to replace data at an unavailable search node 200 identified by the search engine 102, and the data at the unavailable search node 200 can be replaced with data from multiple search nodes 200 to ensure that the search index 108 and/or replicate versions thereof are kept updated.

From operation 312, the method 300 proceeds to operation 314. Additionally, the method 300 can proceed to operation 314 from operation 308. The method 300 ends at operation 314.

Figure 4:
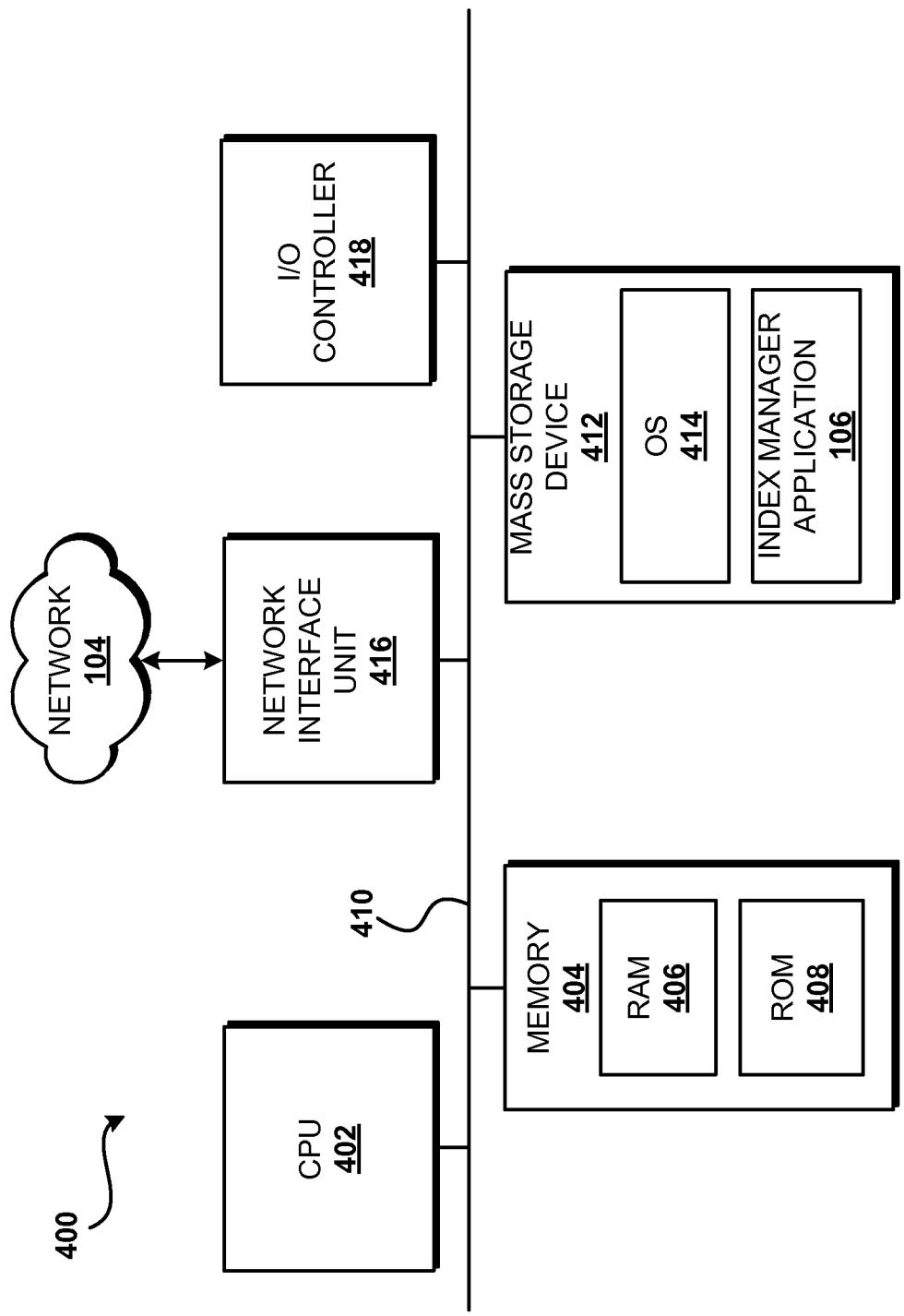
FIG. 4 is a computer architecture diagram illustrating an illustrative computer hardware and software architecture for a computing system capable of implementing aspects of the embodiments presented herein.

FIG. 4 illustrates an illustrative computer architecture 400 for a device capable of executing the software components described herein for managing a search index. Thus, the computer architecture 400 illustrated in FIG. 4 illustrates an architecture for a server computer, a desktop computer, a tablet computer, a laptop computer, and/or another computing device. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 414 and one or more application programs including, but not limited to, the index management application 106. Although not shown in FIG. 4, the mass storage device 412 also can be configured to store the search index 108, the data 110, and/or other data described herein, if desired.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium" and variations thereof, does not include waves, signals, and/or other transitory and/or intangible communication media, per se.

According to various embodiments, the computer architecture 400 may operate in a networked environment using logical connections to remote computers through a network such as the network 104. The computer architecture 400 may connect to the network 104 through a network interface unit 416 connected to the bus 410. It should be appreciated that the network interface unit 416 also may be utilized to connect to other types of networks and remote computer systems, for example, the search index 108 and/or one or more of the search nodes 200. The computer architecture 400 also may include an input/output controller 418 for receiving and processing input from a number of other devices, including a keyboard, mouse, or electronic stylus (not shown in FIG. 4). Similarly, the input/output controller 418 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Figure 5:
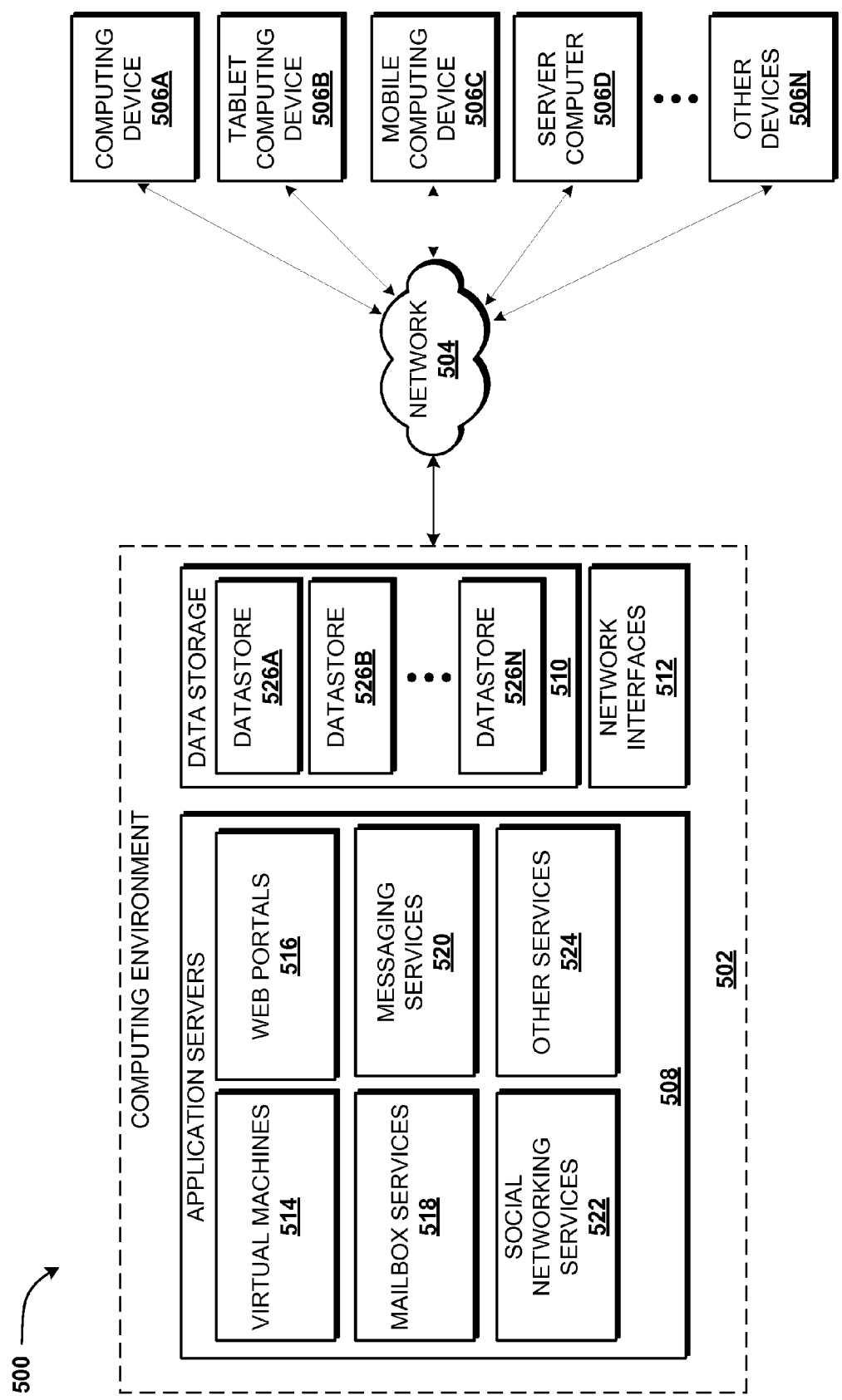
FIG. 5 is a diagram illustrating a distributed computing environment capable of implementing aspects of the embodiments presented herein.

FIG. 5 illustrates an illustrative distributed computing environment 500 capable of executing the software components described herein for managing a search index. Thus, the distributed computing environment 500 illustrated in FIG. 5 can be used to provide the functionality described herein with respect to the search engine 102 and/or one or more of the search nodes 200. The distributed computing environment 500 thus may be utilized to execute any aspects of the software components presented herein.

According to various implementations, the distributed computing environment 500 includes a computing environment 502 operating on, in communication with, or as part of the network 504. The network 504 also can include various access networks. According to various implementations, the functionality of the network 504 can be provided by the network 104 illustrated in FIG. 1. One or more client devices 506A-506N (hereinafter referred to collectively and/or generically as "clients 506") can communicate with the computing environment 502 via the network 504 and/or other connections (not illustrated in FIG. 5). In the illustrated embodiment, the clients 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the computing environment 502. An example computing architecture for the clients 506 are illustrated and described herein with reference to FIG. 4. It should be understood that the illustrated clients 506 and computing architectures illustrated and described herein are illustrative, and should not be construed as being limited in any way.

In the illustrated embodiment, the computing environment 502 includes application servers 508, data storage 510, and one or more network interfaces 512. According to various implementations, the functionality of the application servers 508 can be provided by one or more server computers that are executing as part of, or in communication with, the network 504. The application servers 508 can host various services, virtual machines, portals, and/or other resources. In the illustrated embodiment, the application servers 508 host one or more virtual machines 514 for hosting applications or other functionality. According to various implementations, the virtual machines 514 host one or more applications and/or software modules for providing the functionality described herein for managing a search index. It should be understood that this embodiment is illustrative, and should not be construed as being limiting in any way. The application servers 508 also host or provide access to one or more Web portals, link pages, Web sites, and/or other information ("Web portals") 516.

According to various implementations, the application servers 508 also include one or more mailbox services 518 and one or more messaging services 520. The mailbox services 518 can include electronic mail ("email") services. The mailbox services 518 also can include various personal information management ("PIM") services including, but not limited to, calendar services, contact management services, collaboration services, and/or other services. The messaging services 520 can include, but are not limited to, instant messaging services, chat services, forum services, and/or other communication services.

The application servers 508 also can include one or more social networking services 522. The social networking services 522 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 522 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 522 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 522 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 522 are not mentioned herein for the sake of brevity. As such, the above embodiments are illustrative, and should not be construed as being limited in any way.

As shown in FIG. 5, the application servers 508 also can host other services, applications, portals, and/or other resources ("other resources") 524. The other resources 524 can include, but are not limited to, search services, index management services, network management services, or other resources. It thus can be appreciated that the computing environment 502 can provide integration of the concepts and technologies disclosed herein provided herein for managing a search index with various mailbox, messaging, social networking, and/or other services or resources. For example, the concepts and technologies disclosed herein can be used to maintain search indexes associated with social networking services, mail services, messaging programs, or the like.

As mentioned above, the computing environment 502 can include the data storage 510. According to various implementations, the functionality of the data storage 510 is provided by one or more databases operating on, or in communication with, the network 504. The functionality of the data storage 510 also can be provided by one or more server computers configured to host data for the computing environment 502. The data storage 510 can include, host, or provide one or more real or virtual datastores 526A-526N (hereinafter referred to collectively and/or generically as "datastores 526"). The datastores 526 are configured to host data used or created by the application servers 508 and/or other data. Although not illustrated in FIG. 5, the datastores 526 also can host or store the search index 108, the data 110, the index portions 114, the replicate index portions 118, and/or other data, if desired.

The computing environment 502 can communicate with, or be accessed by, the network interfaces 512. The network interfaces 512 can include various types of network hardware and software for supporting communications between two or more computing devices including, but not limited to, the clients 506 and the application servers 508. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the clients 506. It should be understood that the clients 506 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 500 to utilize the functionality described herein for managing a search index.

Based on the foregoing, it should be appreciated that technologies for managing a search index have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A computer-implemented method for managing a search index, the computer-implemented method comprising performing computer-implemented operations for:

identifying, at a computer executing a search engine, a plurality of search nodes configured to host the search index;

determining that an unavailable search node of the plurality of search nodes has been unavailable;

determining if data stored at the unavailable search node is to be replaced; and in response to determining that the data at the unavailable search node is to be replaced, identifying at least one source for the data, the at least one source comprising at least one of the plurality of the search nodes, and
replacing the data stored at the unavailable search node with data from the at least one source.

2. The method of claim 1, wherein determining that the unavailable search node has been unavailable comprises;
detecting a failure at the unavailable search node, and
determining that the failure at the unavailable search node is remedied.

3. The method of claim 2, wherein detecting the failure at the unavailable search node comprises at least one of:
detecting an unsuccessful read attempt at the unavailable search node,
detecting an unsuccessful write attempt at the unavailable search node,
detecting that a ping directed to the unavailable search node has not been responded to by the unavailable search node,
detecting a hardware error at the unavailable search node, or
detecting a failure during a configuration of the unavailable search node.

4. The method of claim 1, further comprising in response to determining that the data at the unavailable search node is not to be replaced, updating the data at the unavailable search node.

5. The method of claim 1, wherein the at least one source comprises a plurality of sources.

6. The method of claim 1, wherein the data stored at the unavailable search node comprises the search index, and wherein the data from the at least one source comprises a copy of the search index.

7. The method of claim 1, wherein the data from the at least one source comprises an index portion comprising a portion of the search index, and wherein the data stored at the unavailable search node comprises a replicate index portion comprising a copy of the index portion.

8. The method of claim 7, wherein the at least one source comprises a node, and wherein the unavailable search node comprises a replicate node.

9. The method of claim 1, wherein a first of the plurality of search nodes is configured to maintain an index portion comprising a first portion of the search index, wherein a second of the plurality of search nodes is configured to maintain a replicate index portion comprising a copy of the index portion, and wherein the first of the plurality of nodes and the second of the plurality of nodes are configured to communicate with one another.

10. The method of claim 1, wherein replacing the data stored at the unavailable search node with data from the at least one source comprises issuing a command to copy the data from the at least one source to the unavailable search node.

11. A computer storage medium having computer readable instructions stored thereupon that, when executed by a computer, cause the computer to:
identify a plurality of search nodes configured to host a search index associated with a search engine;
determine that an unavailable search node comprising one of the plurality of search nodes has been unavailable;
in response to determining that the unavailable search node is available, determine if data stored at the unavailable search node is to be replaced; and
in response to determining that the data at the unavailable search node is to be replaced,
identify at least one source for the data, the at least one source comprising at least one of the plurality of the search nodes,
copy the data from the at least one source to the unavailable search node, and
replace the data stored at the unavailable search node with the data copied from the at least one source.

12. The computer storage medium of claim 11, wherein determining that the unavailable search node has been unavailable comprises detecting, at the computer, a failure at the unavailable search node.

13. The computer storage medium of claim 11, further comprising computer readable instructions that, when executed by the computer, cause the computer to update the data at the unavailable search node, in response to determining that the data at the unavailable search node is not to be replaced.

14. The computer storage medium of claim 13, wherein updating the data at the unavailable search node comprises:
determining differences between the data at the unavailable search node and the data from the at least one source,
generating data identifying the differences, and
sending the data identifying the differences to the unavailable search node.

15. The computer storage medium of claim 11, wherein detecting the failure at the unavailable search node comprises detecting an unsuccessful read attempt or an unsuccessful write attempt at the unavailable search node.

16. The computer storage medium of claim 11, wherein the data from the at least one source comprises an index portion comprising a portion of the search index, and wherein the data stored at the unavailable search node comprises a replicate index portion comprising a copy of the index portion.

17. A computer storage medium having computer readable instructions stored thereupon that, when executed by a computer, cause the computer to:
identify a plurality of search nodes, each of the plurality of search nodes being configured to host at least one of an index portion comprising a portion of a search index associated with a search engine or a replicate index portion comprising a copy of the index portion;
determine that an unavailable search node comprising one of the plurality of search nodes has been unavailable;
determine if data stored at the unavailable search node is to be replaced;
in response to determining that the data stored at the unavailable search node is not to be replaced, update the data at the unavailable search node; and
in response to determining that the data at the unavailable search node is to be replaced,
identify at least one source for the data, the at least one source comprising at least one of the plurality of the search nodes,
copy the data from the at least one source to the unavailable search node, and
replace the data stored at the unavailable search node with the data copied from the at least one source.

18. The computer storage medium of claim 17, wherein the unavailable search node comprises a replicate node, wherein the data stored at the unavailable search node comprises the replicate index portion, wherein the at least one source comprises a node, and wherein the data from the at least one source comprises the index portion.

19. The computer storage medium of claim 17, further comprising computer readable instructions that, when executed by the computer, cause the computer to replace the data by generating a command to overwrite the data stored at the unavailable search node with the data copied from the at least one source.

20. The computer storage medium of claim 17, wherein the index portion comprises the search index, and wherein the replicate index portion comprises a copy of the search index.

\* \* \* \* \*